(No Model.)
R. S. CRAWFORD.
PNEUMATIC TIRE.
No. 548,745. Patented Oct. 29, 1895.
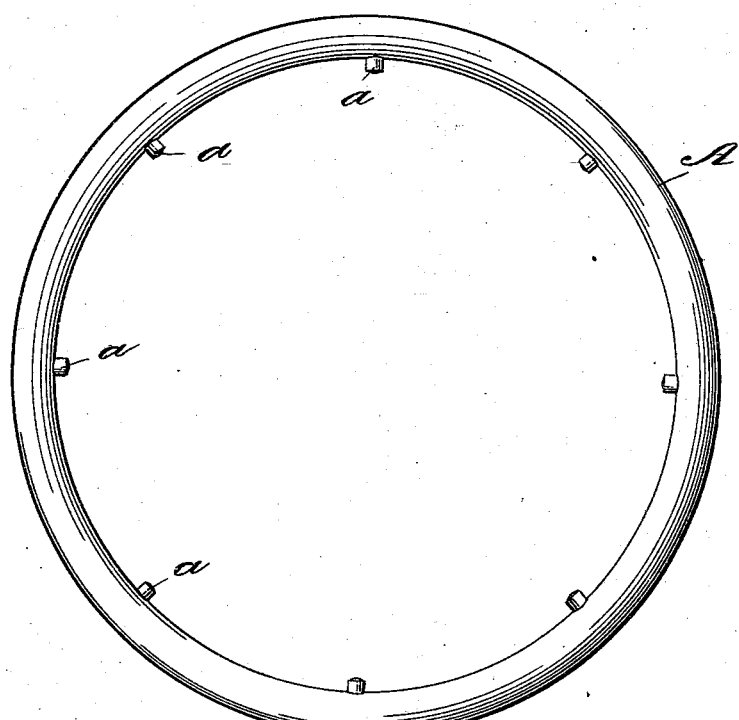
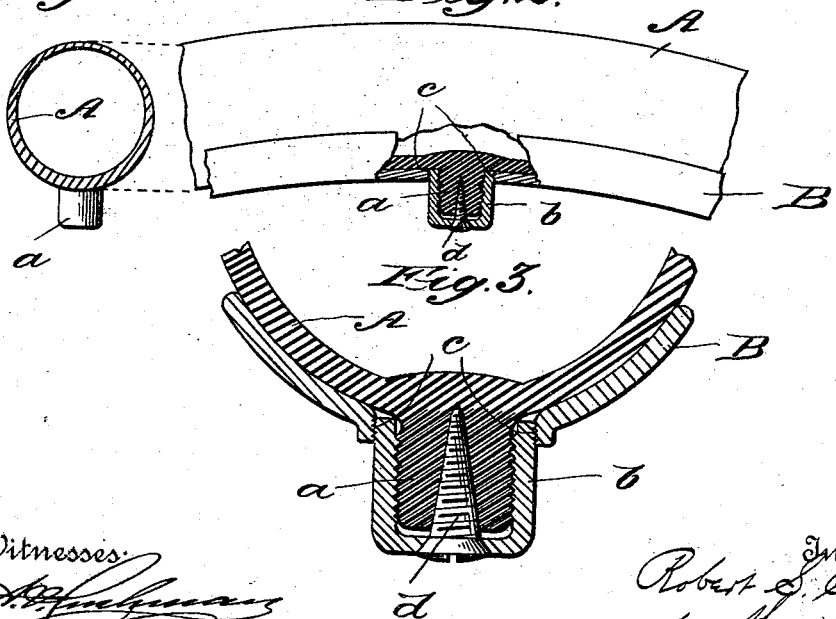

UNITED STATES PATENT OFFICE.

ROBERT S. CRAWFORD, OF HAGERSTOWN, MARYLAND.

PNEUMATIC TIRE.

SPECIFICATION forming part of Letters Patent No. 548,745, dated October 29, 1895.

Application filed March 8, 1895. Serial No. 540,935. (No model.)

*To all whom it may concern:*

Be it known that I, ROBERT S. CRAWFORD, a citizen of the United States, residing at Hagerstown, in the county of Washington and State of Maryland, have invented certain new and useful Improvements in Pneumatic Tires for Vehicles, of which the following is a specification, reference being had therein to the accompanying drawings.

In the use of pneumatic tires on vehicle-wheels more or less difficulty has been experienced by reason of the creeping of the tires on the rims of the wheel, this creeping of the tires endangering the valve-tubes, as the latter are liable to be cut off or rendered inoperative where they pass through the rims of the wheels. Furthermore, where the tires are not rigidly and positively attached to the rims they are liable when they become partially deflated to become elongated and thereby loosened from the rims.

My invention has for its object to obviate these difficulties, and this object is accomplished by providing the tires at their inner peripheries with relatively hard-rubber compound projections to extend into or through recesses formed in the rims of the wheels, these projections by thus positively engaging the wheel-rims serving to prevent any creeping of the tires. I also preferably provide mechanical fastening devices, which are secured to the wheel-rims and which engage these rubber projections on the tires so as to positively secure the tires at these projections to the wheel-rims.

In the accompanying drawings, Figure 1 is a side view of a pneumatic tire constructed in accordance with my invention; and Figs. 2 and 3 are enlarged detail views of the tire and showing, also, portions of the wheel rim or felly. Fig. 4 is a cross-section of the tubular tire.

A denotes a rubber pneumatic tire made as a complete tube, provided at its inner circumference with inwardly-projecting radial lugs $a$, which consist, preferably, of rubber or a rubber compound much harder than the material of the tire, the parts of the latter at which these lugs are located being preferably formed somewhat thicker than the main portion of the tire, and these projections being by vulcanization made practically integral with the tire.

B denotes a portion of the wheel-rim provided with openings or recesses through it, into which the projections $a$ extend.

In order to positively secure the projections $a$ to the wheel-rim B, the holes in the latter, through which the projections $a$ extend, are preferably screw-threaded for the engagement therewith of caps $b$, these caps being threaded interiorly for engagement with threaded or roughened portions of the said lugs $a$, the threads in the interior of the said caps $b$ being of a coarser pitch than the threads at the points $c$, where the said caps are screwed into the holes in the rim B, so that in turning in said caps there will be a greater outer movement or pull on the lugs $a$ than the inner movement of the said caps, and thus the said lugs will be forced outward and will be held strongly by the interiorly-threaded portions of the said caps. To still further secure these lugs within the screw-caps $b$, tapering screws $d$ are preferably inserted into said lugs through said caps, these tapering screws wedging the lugs outward against the threaded interiors of the said caps, so as to give the latter a strong and secure hold upon said lugs. I do not wish, however, to be understood as limiting my invention to the devices herein shown, by which the rubber lugs $a$ are mechanically secured to the rims B, as any other equivalent mechanical attaching devices may be employed, or, in fact, the advantages of my invention may be attained, although perhaps not so perfectly, without the use of any mechanical devices for securing the lugs to the rims other than merely the projection of the said lugs into or through openings or recesses in said rims; also, I do not wish to limit my invention to a particular form of rubber lugs herein shown, as these may be widely varied without departing from the spirit of my invention.

Having thus described my invention, I claim and desire to secure by Letters Patent—

1. The combination with a pneumatic tire having on its inner side inwardly extending lugs or projections integral with said tire and consisting of a relatively hard rubber compound, of a wheel rim having screw-threaded openings through which said projections extend and caps located at the inner side of the rim and exteriorly threaded at their ends for engagement with threaded openings of said rim, said caps receiving said projections and serving as housings therefor.

2. The combination with a pneumatic wheel tire provided at its inner side with radial lugs or projections $a$, of the rim B provided with openings through which said projections extend, and caps $b$ interiorly threaded for engagement with the said lugs and exteriorly threaded at their inner ends for engagement with the said rim.

3. The combination with a pneumatic wheel tire provided at its inner side with radial lugs or projections $a$, of the rim B provided with openings through which said projections extend, caps $b$ interiorly threaded for engagement with the said lugs and exteriorly threaded at their inner ends for engagement with the said rim, and tapering screws $d$ inserted through said caps into said lugs.

In testimony whereof I affix my signature in presence of two witnesses.

ROBERT S. CRAWFORD.

Witnesses:
   C. T. McCue,
   A. Yingling.